United States Patent Office 2,976,901
Patented Mar. 28, 1961

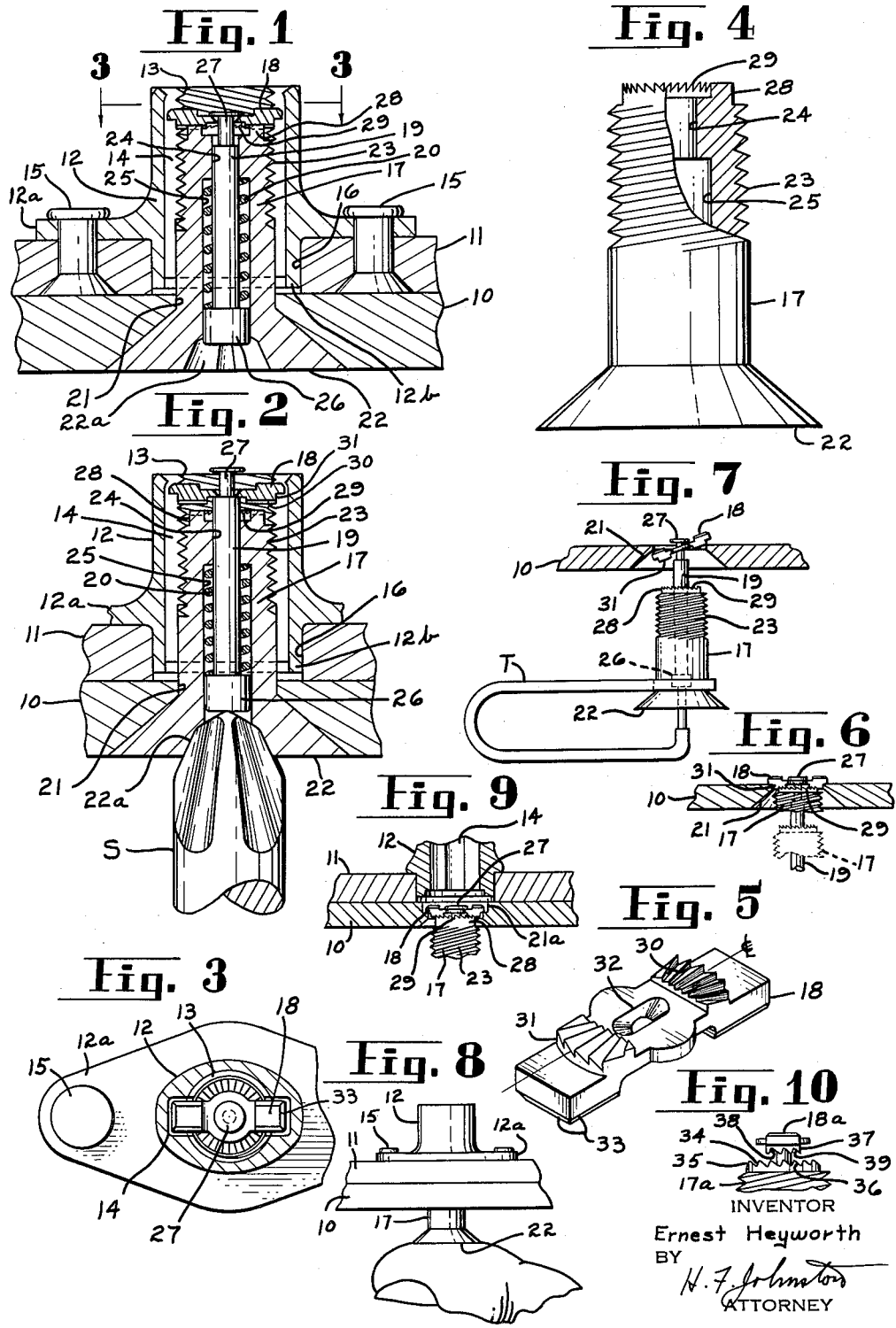

2,976,901

BOLT CARRIED TILTING LOCKING BAR

Ernest Heyworth, Cheshire, Conn., assignor to Scovill Manufacturing Company, Waterbury, Conn., a corporation of Connecticut Filed Jan. 2, 1958, Ser. No. 706,810

1 Claim. (Cl. 151—11)

My invention is a vibration-proof fastener intended for securing together two flat metal sheets and is especially suited for use as an aircraft fastener. The invention relates to that type of fastener having a threaded socket attached to the inner surface of the inside plate and a threaded stud extending through a hole in the outer plate and having threaded engagement with the socket. This results in a fastener which has high strength and in which the plates are held rigidly together.

An object of the invention is to provide an improved fastener of this type having an improved locking device to prevent the stud from loosening in the socket under severe vibration.

Another object is to provide an improved fastener of this type in which the locking device is carried by the stud and in which the locking device serves as a retainer to prevent the stud from falling away from the outer plate when the plates are disconnected.

Another object of the invention is to provide an improved locking device for a fastener of this type which will be effective at the maximum number of locations so as to adopt the fastener to plates of varying thicknesses and at the same time permit them to be drawn tightly together and held securely in such position.

Another object of the invention is to provide an improved fastener of this type wherein the locking device carried by the stud may enter a recess of the outer plate permitting relative sliding movement between the plates during assembly and at the same time retain the stud in the outer plate.

Other objects and advantages of the invention will hereinafter more fully appear. In the accompanying drawings, I have shown for purposes of illustration, one embodiment which is adaptable for the majority of cases and two modifications thereof which are useful for some purposes. In the drawings:

Fig. 1 is a vertical sectional view of the fastener unit showing it in locked position.

Fig. 2 is a similar view showing the locking bar held in released position by a tool.

Fig. 3 is a cross-sectional view of the housing taken along the line 3—3 of Fig. 1 and showing an end view of the stud unit.

Fig. 4 is a side view of the stud unit, per se, with a portion in section.

Fig. 5 is a perspective view of the underside of the locking bar, per se.

Fig. 6 is a side view of the inner end portion of the stud showing how the locking bar retains the stud against accidental separation from the outer plate.

Fig. 7 is a side view of the stud with a tool in the act of inserting the stud or removing it from the panel.

Fig. 8 is a side view of the fastener and attached plates showing the ease of assembly.

Fig. 9 is a cross-sectional view of a portion of the fastener parts showing a modified construction, and Fig. 10 is a modified form of the ratchet end of the stud and locking bar.

The fastener is adapted to hold rigidly together a removable outer plate or panel 10 and an inner plate 11. The latter carries the female unit or retainer socket of the fastener and the outer plate carries the stud unit. The retainer socket consists of a tubular housing 12 having a threaded interior bore 13 extending through a portion of its hollow interior. The hollow interior is formed with a pair of diametrically opposed channels 14 extending the entire length of the hollow interior. The housing 12 has a flange or wing 12a intermediate its length which is fitted against the inner surface of the inner plate 11 and secured thereto as by rivets 15. The outer end 12b of the housing 12 is fitted into an opening 16 in the plate 11 for the purpose of centralizing the said housing in said opening and also serves to transmit shear loads from the fastener to the inner plate in case any severe lateral strain is imposed on the plates 10 and 11 relative to each other.

The stud unit consists of a stud 17, a locking bar 18 extending across the inner end of the stud, a pin or plunger 19 and a coil spring 20. The stud unit is rotatably mounted in an opening 21 in the outer plate 10. The stud illustrated has a flat head 22 formed with a tool-engaging recess 22a of the type used in the "Phillip's" head screw although it is to be understood that other types of heads may be used.

The plate opening 21 is adapted to rotatably receive the stud 17 and its flat head 22 so that said head will be flush with the outer surface of said plate 10 when the stud unit is in assembled position as shown in Fig. 1. About one half of the length of the stud shank is provided with a thread 23 for threaded engagement with the interior threaded bore 13 of the housing 12, the thread 23 in the bore being preferably of a quick lead or plural type to expedite the assembly and disassembly of the stud 17 with the housing 12. The stud 17 is formed with a central bore 24 and a larger counter bore 25. The plunger 19 is slidably fitted in the stud bore 24 and is provided with an enlarged head 26 that slidably fits in the counter bore 25. The inner end of the plunger 19 is formed with a reduced shank and head 27 thus presenting two opposed shoulders for loosely retaining the locking bar 18 on the end thereof. The connection between the plunger shank and head 17 and the locking bar 18 is such as to allow some tilting action of said bar relative to said plunger 19 for reasons which will appear later.

The purpose of the locking bar 18 is to lock the stud unit in the housing 12 against loosening of the stud by counter-clockwise twisting unless accomplished intentionally by a suitable tool such as a screw driver. In order to provide such a locking feature, the end of the stud 17 is formed with an extended annulus 28 terminating in a series of radial ratchet teeth 29 that are adapted to engage with a series of complemental ratchet teeth 30 formed on the surface of projections 31 extending from the inner face of the locking bar 18.

In the form of the invention which it is thought will find the widest use, the teeth 29 on the end of the stud 17 and the ratchet teeth 30 on the bar 18 are such that one face of the teeth is substantially parallel to the stud axis while the opposite face may be at an angle of substantially 45° to the parallel face. This type of ratchet teeth requires that the locking bar 18 must be displaced from the end of the stud 17 before there can be any counter-clockwise twisting of the stud for removing the stud from the housing 12. The ends of the locking bar 18 as seen in Figs. 1 and 2 extend beyond the diameter of the stud shank and its ends are adapted to slidably engage in the opposed channels 14 of the housing 12. The teeth 30 of the locking bar are normally held in locked engagement with the teeth 29 on the stud 17 by means of the coil spring 20 compressed between the base of the counter bore 25 and the plunger head 26. The length of plunger 19 is such that its head 26 normally extends a sufficient distance into the head recess 22a to be engaged by an operating tool as shown in Fig. 2. It is to be noted from the center line drawn along the inner face of the locking bar 18 in Fig. 5 that the ratchet teeth 30 on one section of the bar are arranged in staggered relationship to the ratchet teeth on the opposite section. This is for the purpose of obtaining twice the number of places where the teeth on one end of the bar may engage with the teeth on the stud, and that is one of the reasons why the locking bar 18 is mounted on the end of the plunger with sufficient looseness to allow a substantial endwise tilting action. To allow for a sufficient tilting action, the opening 32 in the bar is preferably of an elongated conical shape facing toward the toothed side of said bar, the elongation being in the direction of the length of said locking bar as best seen in Fig. 5. It is to be noted also that the edges of the locking bar 18 opposite from the projections 31 have beveled corners 33 in order to facilitate guiding the stud 17 into the socket 12 for assembly purposes.

In the operation of securing the assembled plates 10 and 11 together, it is first necessary to assemble the stud 17 into the plate 10 and in order to do so it is necessary to move the locking bar 18 from the end of the stud 20 against the influence of the spring 20. For that purpose, a suitable tool T such as shown in Fig. 7 may be employed wherein one end is adapted to engage around the stud shank adjacent the head 22 while the opposite end is provided with a suitable projection adapted to enter the head socket 22a and engage the plunger head 26 whereupon the tool T may be manually compressed to push the head 26 inwardly and moving the locking bar 18 a sufficient distance from the end of the stud 17 so that said stud may be angled inwardly through the opening 24. The fact that the bar 18 is free to tilt endwise in the manner as shown in Fig. 7, greatly facilitates the insertion of the stud in the outer plate 10. The removal of the stud from the carrier plate may be accomplished in a like manner for repair or replacement purposes. Next the two plates 10 and 11 should be juxtapositioned so that the opening 16 in the outer plate 10 is aligned with the opening 16 in the inner plate 11, whereupon the stud unit may be inserted into the housing 12 with the crossbar 18 engaging in the opposed channels 14. When the threads at the leading end of the stud 17 engage the threads 13 of the housing 12, the assembly of stud into the housing may be completed by turning the head 22 of the stud in a clockwise direction. The shape of the ratchet teeth 30 on the cross-bar 18 and complemental teeth 29 on the stud and the character of the spring 20 are such that the assembly may be quickly performed merely by a slight pressure of the thumb on the stud head 22 as shown in Fig. 8 and turning in a clockwise direction. After the stud is manually turned as far as possible, the final tightening assembly is accomplished by inserting a suitable tool S into stud head recess 22a and turning.

The removal of the stud 17 from housing 12 can only be accomplished in the preferred form of the invention by inserting a tool S into the stud head recess 22a and turning in a counterclockwise direction. In this operation, the pointed end of the tool S will first engage the plunger head 26 urging the plunger 19 inwardly against the influence of the spring 20 and releasing the locking bar 18 from the stud ratchet teeth 29, whereupon the stud may be removed from the housing by turning in a counterclockwise direction. It is to be understood that the studs 17 are normally carried by the outer plate 10 and provision is made to prevent the studs from accidently falling away or being unintentionally removed from the plate 10. For this purpose, the size of the projections 31 on the locking bar 18 is substantially the same as the size of the stud diameter, thus these projections have a relatively snug fit into the cylindrical portion of the plate opening 21. If perchance the stud should be pulled outwardly from the plate 10 and separated from the locking bar 18 to the position shown in dotted outline in Fig. 6, the projections 31 will prevent said locking bar from moving laterally in the opening 21 or relative to the plate 10 and assuming the position shown in Fig. 7.

In some instances, the openings in the plates 10 and 11 may be somewhat out of alignment and one must be forced to slide on the other to bring them into alignment. To permit such action, the plate 10 may be formed with a counter bore 21a on its inner surface in line with the opening 21. This counterbore will receive the locking bar 18 so that no portion thereof will project above the upper or inner surface of the outer plate 10. This is to permit the sliding movement of the plates 10 and 11 relative to each other for the purpose of bringing into alignment their respective openings. (See Fig. 9.)

It is also within the purview of this invention to make the fastener in such a manner that it will not be necessary to release the locking bar teeth from the ratchet teeth on the stud so as to permit other types of tools to be used to remove the stud. Such a modified combination is shown in Fig. 10 wherein the co-operating ratchet teeth on the stud and locking bar are made as shown. Herein, instead of having that side of the teeth which faces the anti-clockwise direction of rotation substantially parallel to the stud axis, that side 34 of the teeth 35 on the end of the stud 17a will be arranged at an angle of about 20° or more to the stud axis while the opposite face 36 may remain at the angle of 45°. Similarly, the teeth 37 on the locking bar 18a will have side 38 on the corresponding angle of about 20° or more while the opposite side 39 will be 45°. With this modified construction, it is of course not necessary to have the type of stud head shown in the preferred form, and the stud head may be of the type having a Bristol or Allen type socket, or the stud can be furnished with an ordinary hex head. Regardless of what type of head is used, it will only be necessary to apply enough torque to the stud in a counterclockwise direction so that the more abrupt angular faces of the teeth on the stud and locking bar will cam over each other against the influence of the spring 20 for the purpose of withdrawing the stud for the socket. Nevertheless, the spring-held locking bar will effectively resist any anti-clockwise movement of the stud, so that it will still lock the fastener against loosening up under vibration.

It will be obvious that changes and variations may be made in the various forms illustrated by those skilled in the art without departing from the spirit of the invention and coming within the scope of the claim.

I claim:

A fastener of the class described comprising an internally threaded socket adapted for attachment to an inner plate, a threaded stud adapted to project through a hole in an outer plate and engage the internally threaded bore of said socket, said bore having diametrically opposed channels parallel to the axis of the bore, a locking bar extending across the inner end of said stud with the ends of said bar adapted to extend into said channels to prevent relative rotation between said bar and the socket member while permitting relative sliding movement, means for yieldingly holding said bar against the end of said stud comprising a plunger having a reduced neck and opposed shoulders on its inner end between which said locking bar is movably confined, said plunger extending into an axial bore of said stud and a spring in said bore surrounding said plunger, radial ratchet teeth on the end face of said stud around the periphery thereof and complemental ratchet teeth on the adjacent faces of the said locking bar whereby relative rotation between said stud and locking bar and thus between the stud and socket is resisted when said bar is held against the stud by said spring and plunger, said locking bar having an elongated conical hole opening on the toothed side of said bar to permit tilting action of said bar in one plane, the teeth on one side of the locking bar being staggered relative to or out of diametrical alignment with those on the opposite side of the locking bar and wherein by reason of the tilting action of said bar at least one complemental set of ratchet teeth on one end of the locking bar will have selective locking engagement with adjacent teeth on the end of the stud.

References Cited in the file of this patent

UNITED STATES PATENTS

| | | |
|---|---|---|
| 221,827 | Johnston | Nov. 18, 1879 |
| 570,368 | Berth | Oct. 27, 1896 |
| 1,927,780 | Anderson | Sept. 19, 1933 |
| 2,380,240 | Hufferd | July 10, 1945 |
| 2,438,313 | Burton | Mar. 23, 1948 |
| 2,640,244 | Becker | June 2, 1953 |
| 2,758,625 | Poupitch | Aug. 14, 1956 |
| 2,767,950 | Bellon et al. | Oct. 23, 1956 |

FOREIGN PATENTS

| | | |
|---|---|---|
| 113,786 | Great Britain | Feb. 20, 1919 |
| 973,719 | France | Sept. 20, 1950 |